March 7, 1961 J. RIX 2,973,655
ADJUSTABLE V-BELT PULLEY FOR VARIABLE TRANSMISSIONS
Filed Nov. 23, 1956 3 Sheets-Sheet 1

March 7, 1961 J. RIX 2,973,655
ADJUSTABLE V-BELT PULLEY FOR VARIABLE TRANSMISSIONS
Filed Nov. 23, 1956 3 Sheets-Sheet 2

March 7, 1961  J. RIX  2,973,655
ADJUSTABLE V-BELT PULLEY FOR VARIABLE TRANSMISSIONS
Filed Nov. 23, 1956  3 Sheets-Sheet 3

United States Patent Office 2,973,655
Patented Mar. 7, 1961

2,973,655

ADJUSTABLE V-BELT PULLEY FOR VARIABLE TRANSMISSIONS

Johannes Rix, Hannover, Germany, assignor to Wilhelm Herm. Müller & Co., Kommanditgesellschaft, Hannover, Germany Filed Nov. 23, 1956, Ser. No. 624,000

Claims priority, application Germany Nov. 28, 1955

3 Claims. (Cl. 74—230.17)

The present invention relates to adjustable V-belt pulleys for variable transmissions with axially displaceable lateral discs and springs resting against the transmission shaft and acting upon said lateral discs.

With heretofore known V-belt pulleys of this type, the lateral discs for conveying the torque are connected with the transmission shaft through the intervention of splined portions, key and groove arrangements and the like. These guiding elements provided between the transmission shaft and the lateral discs require special machining operations during the production of the transmission. Furthermore, the respective guiding surfaces must be precisely machined in order to prevent premature wear due to alternating load or changes in the direction of rotation.

It is, therefore, an object of the present invention to provide an adjustable V-belt pulley of the above mentioned type which will overcome the drawbacks set forth above.

It is another object of this invention to provide an improved simplified adjustable V-belt pulley in which the springs acting upon the lateral discs of the pulley will also absorb the circumferential forces thereof.

It is still another object of this invention to provide a V-belt pulley of the above mentioned type with springs acting upon the lateral discs thereof in such a manner that the V-belt will be subjected to even or approximately even pressure throughout the entire range of adjustment of the pulley.

These and other objects and advantages of the invention will appear more clearly from the following specification in connection with the accompanying drawings in which.

The V-belt pulley according to the present invention is characterized primarily in that the discs of the pulley are elastically connected with the transmission shaft through springs acting upon said discs in such a manner that said discs can slightly move relative to said shaft within the limits of elasticity of said springs. In this way, the above mentioned guiding elements become superfluous and cylindrical guiding surfaces which can easily be machined can be employed since the circumferential forces will now be absorbed by the springs which simultaneously act upon the lateral discs and convey the necessary pressure upon the sides of the belts between said discs.

The transmission unit according to the present invention has the further advantage that the circumferential forces are elastically transmitted while the transmission parts and the machines or the like cooperating with said transmission will be protected against undue wear brought about by shocks and the like. In order to eliminate resonance oscillations, it is highly advantageous to employ self-damping springs for conveying pressure to the V-belt and for conveying the torque. Such springs may be designed as hollow springs of rubber or rubber-like material which extend around the transmission shaft and establish a direct connection between the lateral discs of the pulley and the transmission shaft or a bearing fixedly connected to the latter.

According to a further development of the invention, the hollow spring of rubber or rubber-like material may have its ends provided with inclined or tapered surfaces which more and more engage correspondingly shaped surfaces of the lateral discs and bearings on the transmission shaft in conformity with increasing axial load acting upon the lateral discs.

Figure 1:
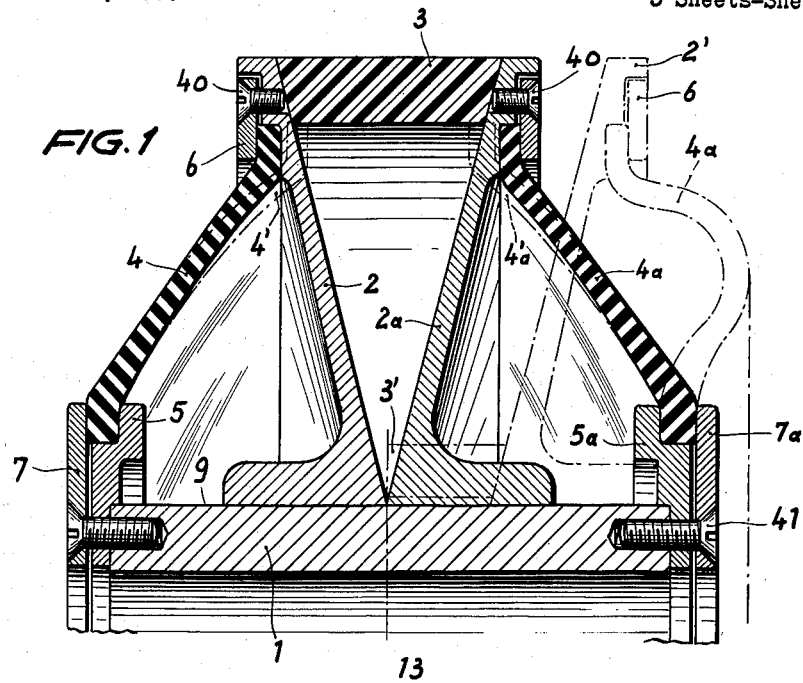
Fig. 1 illustrates a section through a portion of an adjustable V-belt pulley according to the invention.
Figure 2:
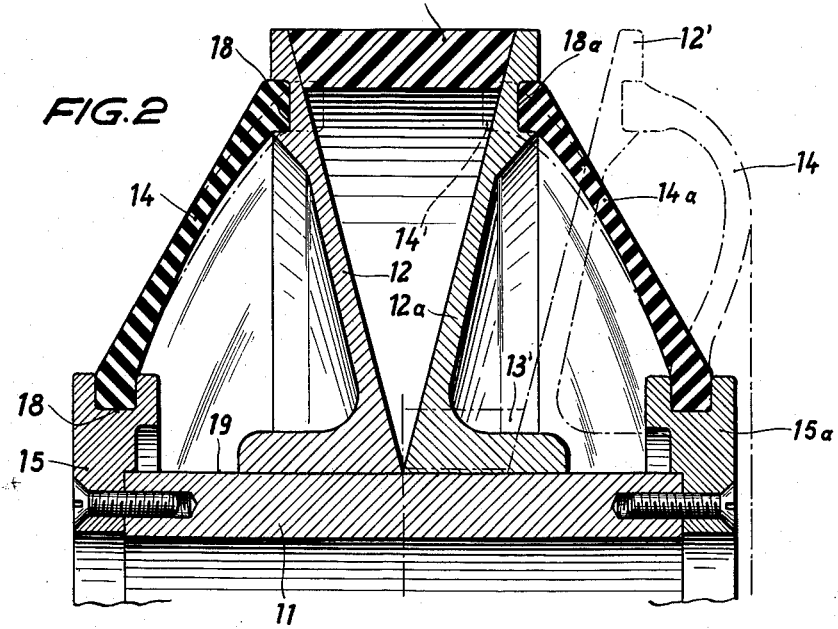
Fig. 2 is a section similar to that of Fig. 1 of a somewhat modified V-belt pulley according to the invention.

Referring now to the drawing in detail and Figs. 1 and 2 thereof in particular, the adjustable V-belt pulley according to the invention consists primarily of the transmission shaft 1 and the two discs 2, 2a for receiving a V-belt 3 therebetween. The discs 2, 2a are axially slidably mounted on the transmission shaft 1 and are acted upon by springs 4, 4a of rubber or rubber-like material which rest against bearings 5, 5a respectively fixedly connected to the transmission shaft 1. The springs 4, 4a as illustrated in Fig. 1 are of truncated cone shape and have those ends defining the largest diameter thereof in engagement with the outer marginal portions of the discs 2, 2a to which they are fixedly connected in any convenient manner, for instance by rings 6 and screws 40. Similarly, the inner ends of the springs 4, 4a are fixedly connected to the rings 5, 5a by means of ring members 7 and screws 41. It will be appreciated that by tightening the screws 40 and 41 the spring ends will be firmly connected to the respective disc and the transmission shaft so that the springs will be able to convey the circumferential forces from the belt 3 in a torsion elastic manner to the shaft 1 and vice versa. During this transfer of forces, the springs will be subjected to a torsional stress. The springs 4, 4a simultaneously serve to press the discs 2, 2a against the belt 3 in the required manner. In order to exert a certain pressure upon the belt 3, when the belt 3 occupies the position shown in Fig. 1, the springs 4, 4a are installed under a certain preload in axial direction. When the springs are under no load, i.e. are not deformed, they will have the shape indicated by the dot-dash line designated with the reference numerals 4' and 4a'.

For varying the rotative speed, one or both of the discs 2, 2a may be displaced in axial direction, for instance into the dot-dash position designated with the reference numeral 2' in which the spring 4a is deformed into an approximately U-shape.

As will be evident from Fig. 1, the transmission shaft 1 has a cylindrical outer contour 9, and the lateral discs 2, 2a are provided with corresponding bores by means of which the discs 2 are journalled on shaft 1 with a running or sliding fit.

The embodiment illustrated in Fig. 2 differs from that of Fig. 1 primarily in that the outer marginal portions of the lateral pulley discs 12, 12a are provided with annular grooves 18, 18a in which the advantageously somewhat reinforced outer end portions of the springs 14, 14a are held. Expediently, the cross sections of the somewhat thickened outer marginal portions of the springs and the likewise reinforced adjacent groove portions 18, 18a of the discs 12, 12a are so dimensioned that the marginal portions of the sprigs 14, 14a when being inserted into the grooves 18, 18a are elastically deformed so as to be compressed and held in their respective grooves under a preload.

In further distinction from the embodiment of Fig. 1, the rings 5, 5a with the adjacent rings 7, 7a of Fig. 1 are in conformity with the embodiment of Fig. 2 replaced by rings or connecting members 15, 15a in which the inner ends of the springs 14, 14a are frictionally held under preload similar to the location of the outer ends of the springs 14, 14a in the grooves 18, 18a.

In Fig. 2 the transmission shaft 11 has a cylindrical outer contour 19 on which the discs 12, 12a are journalled with running or slide fit.

Figure 3:
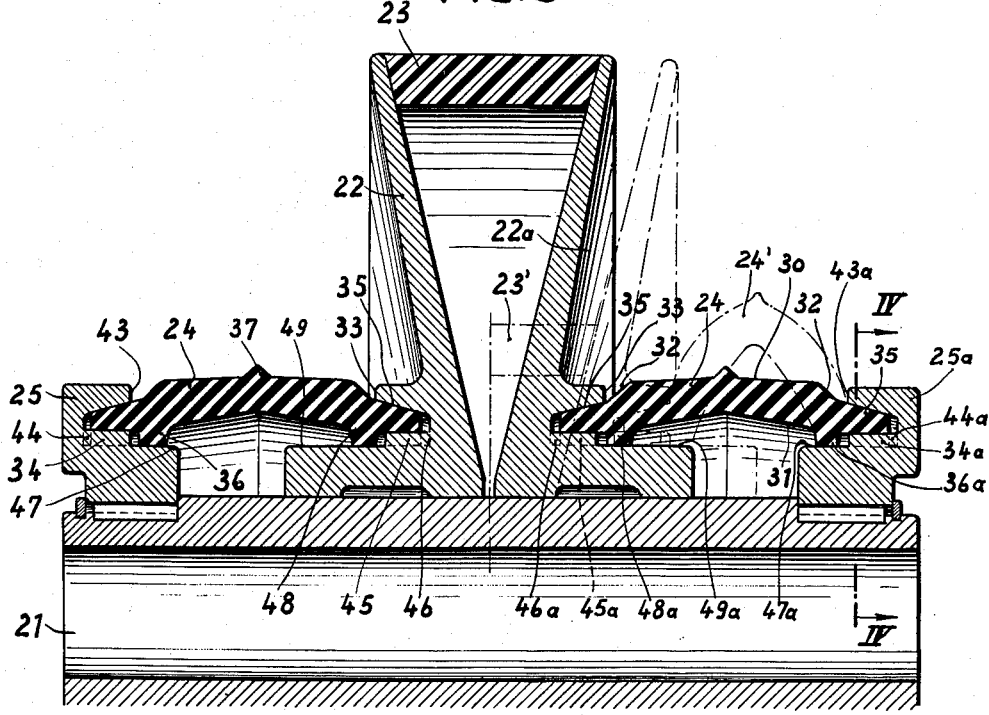
Fig. 3 is a section through a portion of still another modification of the present invention.
Figure 4:
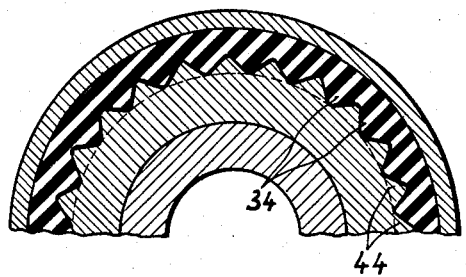
Fig. 4 is a section taken along the line IV—IV of Fig. 3.
Figure 6:
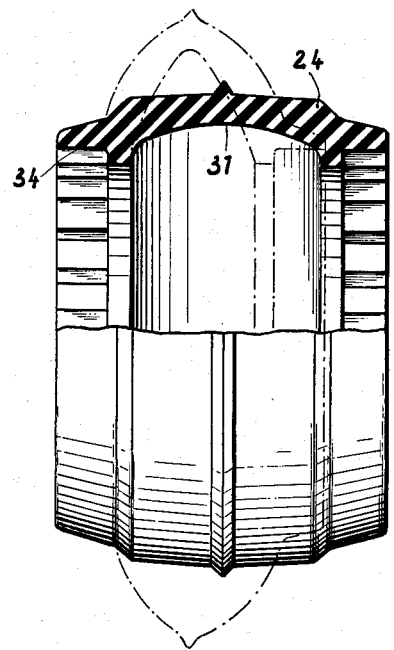
Fig. 6 illustrates a spring somewhat modified over the springs used in connection with the embodiment of Fig. 3.
Figure 7:
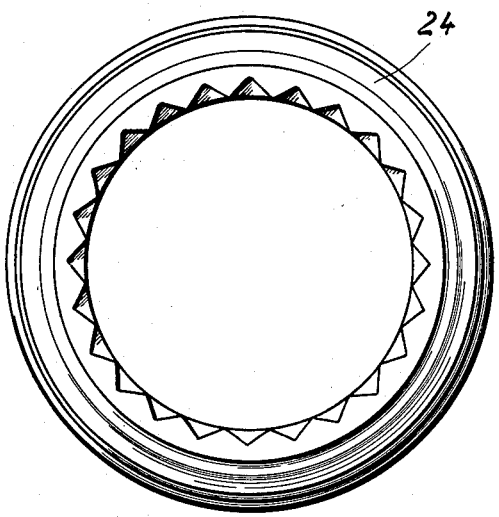
Fig. 7 is a front view of a spring shown in Fig. 6.

The embodiment of the invention as illustrated in Figs. 3 and 4 differs from the embodiment according to Figs. 1 and 2 primarily with regard to the springs of rubber or rubber-like elastic material acting upon the lateral discs of the pulley. More specifically, according to Figs. 3 and 4, the ends of the hollow rubber springs are provided with wedge-like tapered portions which with increasing axial load more and more engage correspondingly shaped recesses in the lateral discs of the pulley and in bearings or connecting members connected to the transmission shaft. Moreover when the hollow springs have a cylindrical outer surface, they are provided with an outwardly arched inner surface so that the springs are thinner near their central portions than near their end portions.

As will be seen from Figs. 3 and 4, the pulley shown therein likewise comprises a transmission shaft 21 and two discs 22, 22a which are axially displaceably mounted on shaft 21 and between which the V-belt 23 is arranged. The pulley according to Figs. 3 and 4 furthermore comprises two hollow springs 24 of rubber or rubber-like material each of which rests against a bearing or connecting member 25, 25a respectively rotatably connected to shaft 21 and against the discs 22 and 22a respectively.

The hollow rubber springs 24 have a nearly cylindrical outer surface 30 which is slightly arched toward the outside. The inner surfaces 31 of the springs 24 are likewise arched toward the outside for instance in a double taper to a larger extent than the outer surfaces 30 so that the springs 24 are thinner near their central sections than near their end sections. As has furthermore been shown in Fig. 3, the ends of the springs 24 are provided with inclined abutment surfaces 32 which merge with the tapered surfaces 35. The discs 22, 22a and the bearings 25, 25a are provided with correspondingly shaped depressions or grooves for receiving the ends of the springs 24 with the tapered surfaces 35. The discs 22, 22a are also provided with surfaces 33, 33a forming abutment means which are substantially perpendicular to the axis of shaft 21. Similarly the bearings 25, 25a are provided with surfaces 43, 43a forming abutment means which are likewise substantially perpendicular to the axis of shaft 21.

The outer ends of the springs 24 are provided with teeth 34, 34a which respectively mesh with corresponding teeth 44, 44a of the bearings 25, 25a. The inner ends of the springs 24 are provided with teeth 45, 45a which mesh with corresponding teeth 46, 46a of the discs 22, 22a respectively. When employing the teeth 34, 34a and the teeth 44, 44a meshing therewith, and when employing the teeth 44, 44a meshing with the teeth 45, 45a, it is not necessary to secure the respective ends of the springs to the adjacent bearings and discs by clamping means as is the case in connection with the embodiments of Figs. 1 and 2. However, the connection of the springs with the adjacent bearings and discs is further improved by the tapered surfaces 35 engaging correspondingly shaped surfaces in the bearings 25, 25a and the discs 22, 22a. It will be appreciated that forces acting in axial direction of the pulley upon the latter will increase the pressure between the teeth of the springs and the teeth meshing therewith and pertaining to the bearings 25, 25a and discs 22, 22a respectively.

The springs are furthermore provided with beads 36, 36a by means of which they rest upon cylindrical surfaces 47, 47a of the bearings 25, 25a. The springs are furthermore provided with beads 48, 48a by means of which they rest on cylindrical surfaces 49, 49a pertaining to hub portions of the discs 22, 22a respectively.

When axially adjusting the discs 22, 22a respectively, for instance when the belt 23 is to be moved into the position 23', it will be appreciated that the springs 24 will be subjected to pressure in axial direction in which instance the inclined surfaces 32 of the springs will abut the surfaces 43, 43a of the bearings 25, 25a respectively. When this happens, the springs 24 bulge out and may for instance assume the position indicated in dot dash lines and designated with the reference numeral 24'.

From the above, it will be appreciated that when a hollow spring of the type set forth in Figs. 3 and 4 is subjected to an axial load as for instance when moving the discs 22, 22a outwardly from the position shown in Fig. 3, the end portions of the springs first abut the adjacent surfaces of the bearings without any bulging out of the spring portion intermediate their end portions. Only after the inclined surfaces 32 fully abut the adjacent surfaces 43, 43a and 33, 33a will the springs start bulging out at their central portions. This bulging out at the central portions of the springs is aided due to the fact that the springs are thinner near their central areas 42 than they are near their end portions which abut against the bearings 25, 25a. It will be evident that in this way a great resiliency is obtained while the bulging out will be kept in relatively small limits which allows a compact construction and installation. This is of particular importance where the arrangement according to the invention is intended to replace pulleys provided with metallic helical springs.

Figure 5:
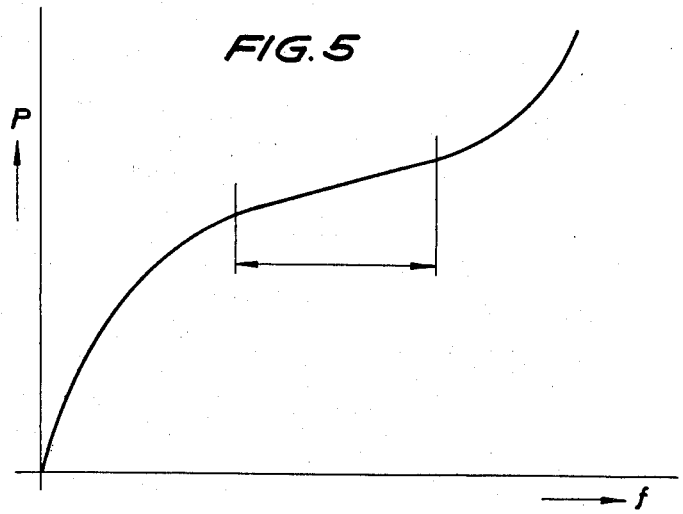
Fig. 5 illustrates by means of example a spring characteristic of a spring employed in connection with the V-belt pulley according to the invention.

It is also of importance that when the hollow rubber spring is subjected to axial load the deformation of the spring along its central portion occurs only after the inclined portions 32 of the springs have abutted the adjacent surfaces 33, 33a and 43, 43a because in this way a highly favorable spring characteristic is obtained as is illustrated by way of example in Fig. 5. As will be seen from this figure, the spring characteristic graph first inclines at a relatively large angle, then harmonically takes a nearly horizontal course and finally prior to reaching the maximum spring stroke again ascends. The spring is installed preferably in such a manner that the central portion of the spring characteristic, i.e. the substantially horizontal portion thereof becomes effective so that the V-belt will be subjected to even or substantially even pressure throughout the range of adjustability.

While the springs 24 have been shown in Fig. 3 with an inner double tapered surface, it is, of course, to be understood that this double taper may also be replaced by an arched surface.

Inasmuch as due to the deformation of the springs 24 the outer surface is subjected to a certain tearing stress, it may be advantageous to provide the outer surface with a bead 37 in order to reduce this stress.

It is, of course, to be understood that the present invention is, by no means, limited to the particular constructions shown in the drawings but also comprises any modifications within the scope of the appended claims.

It is also to be understood that the terms "rubber" and "rubber material" include natural rubber and synthetic rubber.

What I claim is:
1. In combination in a V-belt pulley: a shaft, two disc members supported by said shaft and arranged to receive a V-belt therebetween, said disc members being axially displaceable on said shaft to vary the spacing therebetween, the outside of each of said disc members being provided near the inner portion thereof with abutment means, a pair of connecting members arranged on the outside of said disc members in spaced relationship thereto and fixedly connected to said shaft, said connecting members being provided with an abutment surface facing said abutment means, and two torsion elastic substantially annular spring members respectively interposed between and connected to said disc members and said connecting members for torsionally elastically interconnecting said disc members and said shaft, said spring members being provided with an outer tapering surface near each end surface thereof for engagement with said abutment means and said abutment surfaces in response to a certain decrease in distance between said abutment means and the respective abutment surface facing the latter.

2. In combination in a V-belt pulley: a shaft, two disc members supported by said shaft and arranged to receive a V-belt therebetween, said disc members being axially displaceable on said shaft to vary the spacing therebetween, the outside of each of said disc members being provided near the inner portion thereof with abutment means, a pair of connecting members arranged on the outside of said disc members in spaced relationship thereto and fixedly connected to said shaft, said connecting members being provided with an abutment surface facing said abutment means, and two torsion elastic substantially annular spring members of rubber material respectively interposed between and connected to said disc members and said connecting members for torsionally elastically interconnecting said disc members and said shaft, said spring members being provided with an outer tapering surface near each end surface thereof for engagement with said abutment means and said abutment surfaces in response to a certain decrease in distance between said abutment means and the respective abutment surface facing the latter, said annular spring members slightly bulging outwardly and being thinner at their central areas than between said tapering surfaces and said central areas.

3. In combination in a V-belt pulley: a shaft, two disc members supported by said shaft and arranged to receive a V-belt therebetween, said disc members being axially displaceable on said shaft to vary the spacing therebetween, the outside of each of said disc members being provided near the inner portion thereof with abutment means, a pair of connecting members arranged on the outside of said disc members in spaced relationship thereto and fixedly connected to said shaft, said connecting members being provided with an abutment surface facing said abutment means, and two torsion elastic substantially annular spring members respectively interposed between and connected to said disc members and said connecting members for torsionally elastically interconnecting said disc members and said shaft, said spring members being provided with an outer tapering surface near each end surface thereof for engagement with said abutment means and said abutment surfaces in response to a certain decrease in distance between said abutment means and the respective abutment surface facing the latter, said spring members also being provided at the end faces thereof with teeth meshing with correspondingly shaped teeth of the adjacent disc member and the adjacent connecting member respectively.

References Cited in the file of this patent

UNITED STATES PATENTS

| | | |
|---|---|---|
| 2,409,385 | Pletcher | Oct. 15, 1946 |
| 2,584,703 | Hollerith | Feb. 5, 1952 |
| 2,607,235 | Ruegenberg | Aug. 19, 1952 |
| 2,690,335 | Ballard | Sept. 28, 1954 |

FOREIGN PATENTS

| | | |
|---|---|---|
| 819,937 | Germany | Nov. 5, 1951 |
| 1,132,617 | France | Nov. 5, 1956 |